United States Patent [19]
Fehr et al.

[11] 3,821,226
[45] June 28, 1974

[54] 6-METHYL-8B-UREIDO-ERGOLENES

[76] Inventors: Theodor Fehr, General Guisanstrasse, 4144 Arlesheim; Peter Stuetz, 189 Oeltingerstrasse, 4057 Basel; Paul Stadler, 7 Jakobsweg, 4105 Biel-Benken, all of Switzerland

[22] Filed: May 15, 1972

[21] Appl. No.: 253,105

[30] Foreign Application Priority Data
May 19, 1971 Switzerland.......................... 7379/71
May 19, 1971 Switzerland.......................... 7381/71
May 19, 1971 Switzerland.......................... 7383/71
Dec. 15, 1971 Switzerland........................ 18262/71

[52] U.S. Cl.............................. 260/285.5, 424/261
[51] Int. Cl............................................. C07d 43/20
[58] Field of Search................................. 260/285.5

[56] References Cited
UNITED STATES PATENTS
| | | | |
|---|---|---|---|
| 3,113,133 | 12/1963 | Hofmann | 260/285.5 |
| 3,251,846 | 5/1966 | Semonsky | 260/285.5 |
| 3,324,133 | 6/1967 | Arcamone | 260/285.5 |
| 3,681,497 | 8/1972 | Semonsky | 260/285.5 X |
| 3,717,640 | 2/1973 | Arcari | 260/285.5 |

FOREIGN PATENTS OR APPLICATIONS
1,536,759  8/1968  France............................ 260/285.5

OTHER PUBLICATIONS
Zikaw et al., Coll. Czech. Chem. Commun., Vol. 28, p. 1080–1083 (1963).

Votava, et al., Chem. Abstr. Vol. 59, Col. 9221d (1963)

*Primary Examiner*—Donald G. Daus
*Attorney, Agent, or Firm*—Gerald D. Sharkin

[57] ABSTRACT

This invention provides compounds of the formula:

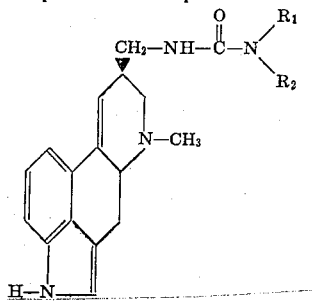

wherein each of $R_1$ and $R_2$ is hydrogen, or alkyl of 1 to 4 carbon atoms, or $R_1$ and $R_2$ together form an alkylene chain of at most 5 carbon atoms, and acid addition salts thereof.

The invention also provides processes for the production of said compounds.

The compounds are useful antihypertensive agents.

8 Claims, No Drawings

6-METHYL-8B-UREIDO-ERGOLENES

This invention relates to heterocyclic compounds.

In accordance with the invention there are provided new compounds of formula I,

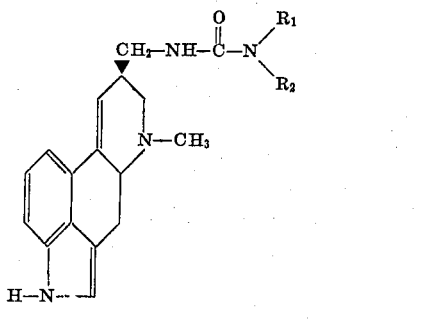

wherein each of $R_1$ and $R_2$ is hydrogen, or alkyl of 1 to 4 carbon atoms, or $R_1$ and $R_2$ together form an alkylene chain of at most 5 carbon atoms, and acid addition salts thereof.

Further, in accordance with the invention a compound of formula I, or an acid addition salt thereof, may be obtained by a process comprising a. reacting an amine of formula III,

wherein $R_1$ and $R_2$ are as defined above, with the acid azide of formula II

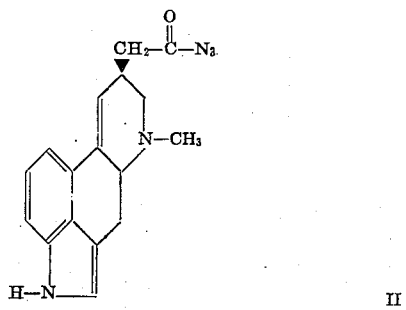

in an aprotic solvent after its rearrangement into the isocyanate, or b. reacting the compound of formula V

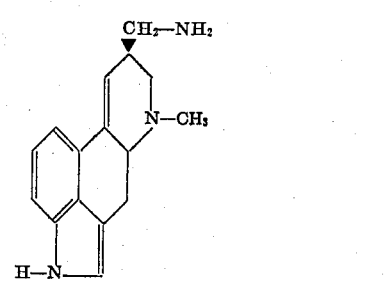

with a reactive carbonic acid derivative containing a corresponding nitrogen group, and, where an acid addition salt is required, converting the resulting compound of formula I into such salt.

Examples of aprotic solvents which may be used in process variant a) are benzene, chloroform and toluene. The reaction is suitably effected at a temperature range of 50°–80°C, and the reaction is conveniently effected in chloroform at the boiling temperature of the same. 1 to 3 mols of a compound of formula III are preferably used for every mol of the compound of formula II.

A preferred method of effecting this process consists in dissolving the acid azide of formula II in chloroform. The solution is boiled at reflux for 15 minutes, a compound of formula III is added, and the mixture is kept at reflux temperature for approximately 30 minutes. By the usual working up of the reaction mixture, the compounds of formula I are isolated, if desired in the form of their salts.

Process variant b) is preferably carried out by using as carbonic acid derivative a compound of formula VIa,

wherein $R_1$ and $R_2$ are as defined above,
and reacting this in the presence of a tertiary organic base with 6-methyl-8β-aminomethyl-ergolene (formula V).

An especially preferred method of carrying out this process variant consists in dissolving the compound of formula V in pyridine, and adding a solution of a compound of formula VIa in pyridine at a temperature of −20° to −10°C. The reaction solution is stirred for a short time at −10°C, and subsequently for a further 10 minutes to 1 hour at 20°–30°C. The reaction mixture is worked up by shaking with methylene chloride/lower alkanol (e.g. ethanol, methanol and isopropanol) and soda. Extraction with methylene chloride/lower alkanol and purification of the crude product by chromatography and crystallization yields the compounds of formula I, if desired in the form of their salts.

A compound of formula Ia,

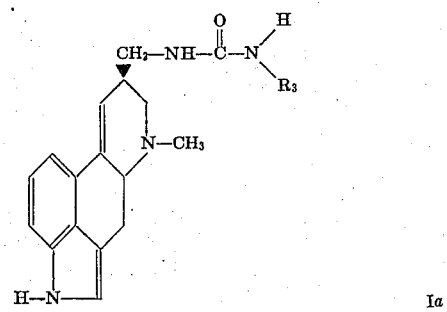

wherein $R_3$ is hydrogen, or alkyl of 1 to 4 carbon atoms,
may likewise be obtained if a compound of formula VIb, $$R_3-N=C=O \qquad VIb$$

wherein $R_3$ is as defined above,
is used as carbonic acid derivative and is allowed to act upon 6-methyl-8β-aminomethyl-ergolene in accordance with process variant b). This is preferably effected by adding a compound of formula VIb to the compound of formula V in a suitable organic solvent, such as methanol or dioxane, at room temperature. Approximately 2 mols of a compound of formula VIb are used for every mol of the compound of formula V. The isocyanic acid may be obtained in situ by the addition of hydrochloric acid to an aqueous solution of potassium cyanate.

The resulting reaction mixture is subsequently boiled at reflux for 10 minutes to 4 hours, and is worked up in the usual manner. The compounds of formula Ia are obtained in pure form, if desired in the form of their salts, by chromatography and/or crystallization of the crude product.

The acid azide of formula II may be produced in accordance with the following process:

A reactive functional derivative of the acid of formula IV,

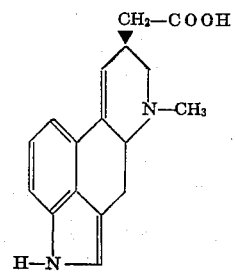

in an inert organic solvent or solvent mixture, is converted into the acid azide of formula II with an alkali azide.

It is preferred to use as reactive derivative of the acid of formula IV the reaction product resulting from the reaction of the acid of formula IV with a chlorinating or brominating agent, e.g. thionyl chloride, phosgene, phosphorus oxychloride, phosphorus oxybromide or oxalyl chloride, and an N-di(lower)alkyl-substituted acid amide of an aliphatic monocarboxylic acid of 1 to 3 carbon atoms, such as dimethyl formamide or dimethyl acetamide.

However, it is also possible to use other reactive derivatives of the acid of formula IV, e.g. the acid chloride hydrochloride, the addition product with carbodiimide, or mixed anhydrides of the acid of formula IV with sulphuric acid or trifluoroacetic acid.

The reaction of a reactive functional derivative of the acid of formula IV with an alkali azide is preferably effected at a temperature of −25° to +10°C. Examples of inert organic solvents which may be used are: chloroform, methylene chloride, acetonitrile and dimethyl formamide, or mixtures thereof.

The reaction is preferably effected by adding the acid of formula IV, suspended in a mixture of acetonitrile and methylene chloride, at a temperature of −15°C, to the reaction product of dimethyl formamide and oxalyl chloride in an inert organic solvent, preferably acetonitrile. (However, the reaction is not dependent on the sequence of the addition of the reagents.) The resulting mixture is stirred at 0°C for 1 hour, and an aqueous solution of sodium azide is subsequently added. The reaction solution is cooled to −5°C, and stirred turbulently for 5 minutes. Working up is effected by pouring the solution on methylene chloride, shaking thoroughly with a saturated sodium bicarbonate solution, and extracting with methylene chloride. The organic phase is further treated in known manner. The resulting acid azide of formula II may be used without further purification.

The 6-methyl-8β-aminomethyl-ergolene (formula V), used as starting material, is new and may be produced in accordance with the following process:

Lysergol of formula VII

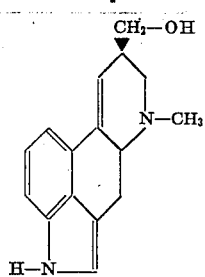

is suspended in an inert organic solvent, preferably acetonitrile, with the addition of an acid-binding agent, e.g. pyridine, and a solution of methanesulphonic acid chloride in an inert organic solvent, preferably acetonitrile, is added. The temperature should not exceed 30°C. The mixture is allowed to react at 25°C for 2 hours, is cooled to −20°C for working up, methanol is added, the mixture is subsequently poured on water, and the resulting solution is rendered alkaline with a 2 N ammonia solution. By further treating the organic phases in the usual manner, the compound of formula VIII

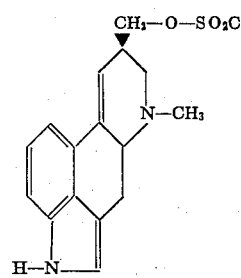

is obtained as crystalline product.

The compound of formula VIII is subsequently converted into the alkyl azide of formula IX

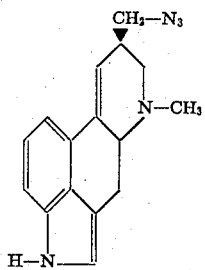

by reacting with alkali azide. The reaction is effected at a temperature in the range of 70°–100°C, preferably at 80°C. Suitable solvents are mixtures of dimethyl formamide or hexamethylphosphoric acid trisamide with water.

The desired starting material of formula V is obtained by reducing the azido compound of formula IX in an inert organic solvent. The reduction may, for example, be effected with lithium aluminium hydride or sodium stannite at −10° to +40°C. Ether, tetrahydrofuran, ethanol, dioxane, dimethyl formamide, or mixtures thereof, may be used as solvents, depending on the method.

Insofar as the production of the starting materials is not particularly described, these are known or may be produced in accordance with known processes, or in a manner analogous to the processes described herein or to known processes.

The compounds of formula I, produced in accordance with the invention, are crystalline compounds at room temperature, and with inorganic or organic acids they form salts which are crystalline at room temperature.

The compounds of formula I are useful because they possess pharmacological activity in animals. In particular, the compounds are useful as anti-hypertensive agents, as indicated by tests in the awake hypertonic Grollman rat and in the awake hypertonic Goldblatt dog upon administration of 0.05 to 0.5 mg/kg animal body weight of the compounds.

For the above-mentioned use, the dosage administered will, of course, vary depending on the compound employed, mode of administration and treatment desired. However, in general satisfactory results are obtained when administered at a daily dosage of from about 0.01 to 3.0 mg/kg of animal body weight, conveniently given in divided doses 2 to 3 times a day or in sustained release form. For the larger mammals, the total daily dosage is in the range of from about 1 to 200 mg, and dosage forms suitable for oral administration comprise from about 0.3 to 100 mg of the compound admixed with a solid or liquid pharmaceutical carrier or diluent.

A particularly interesting compound is 6-methyl-8β-(3-dimethylureidomethyl)ergolene.

The compounds of formula I may be administered in pharmaceutically acceptable acid addition salt form. Such salts possess the same order of activity as the free bases and are readily prepared in conventional manner. Suitable such salt forms include ogranic acid salts such as the fumarate, tartrate, methanesulphonate and citrate, and mineral acid salts such as the hydrochloride and sulphate.

The invention also provides a pharmaceutical composition comprising a compound of formula I, in free base or pharmaceutically acceptable acid addition salt form, in association with a pharmaceutical carrier or diluent. A suitable pharmaceutical form is a capsule.

In the following non-limitative Examples all temperatures are indicated in degrees Centigrade.

EXAMPLE 1:
6-Methyl-8β-(3,3-dimethylureidomethyl)ergolene [process variant a)]

10.91 g (35.6 millimols) of 6-methyl-9-ergolene-8β-acetic acid azide are dissolved in 200 cc of absolute chloroform, and the solution is boiled at reflux for 15 minutes. A solution of 3.5 g (77.8 millimols) of dimethylamine in 90 cc of chloroform is added, and the mixture is refluxed for a further 35 minutes. After removing the solvent on a rotary evaporator, the resulting brown foam is dissolved in 400 cc of acetone and is decolourized with active charcoal. The solution is concentrated by evaporation to a small volume, whereby a crystalline product is obtained, which is again crystallized from acetone and then has a M.P. of 191°-192° (decomp., high vacuum). $[\alpha]_D^{20}=+67.3°$ ($c=0.508$ in methanol).

The 6-methyl-9-ergolene-8β-acetic acid azide, used as starting material, may be produced as follows:

13.6 cc (0.159 mols) of oxalyl chloride, dissolved in 20 cc of acetonitrile, are added dropwise at −15° to a mixture of 160 cc of dimethyl formamide and 80 cc of acetonitrile. The resulting complex is stirred at −15° for a further 10 minutes, and then 40 g (0.142 mols) of 6-methyl-9-ergolene-8β-acetic acid, which have been previously suspended in 250 cc of methylene chloride and 40 cc of acetonitrile, are added. After stirring at 0° for 1 hour, a solution of 35.2 g (0.54 mols) of sodium azide in 144 cc of water is added. The solution is turbulently stirred at −5° for 5 minutes and is then poured on 2 litres of methylene chloride. 800 cc of a saturated sodium bicarbonate solution are added to this solution, and further shaking is effected. The usual extraction with methylene chloride, removal of the solvent on a water pump vacuum at 30° and drying in a high vacuum, yields the desired azide as light foam.

EXAMPLE 2:
6-Methyl-8β-(3-[n-butyl]-ureidomethyl)ergolene [process variant a)]

9.1 g (29.6 millimols) of 6-methyl-9-ergolene-8β-acetic acid azide are boiled in 300 cc of chloroform for 15 minutes, 2.95 cc (30 millimols) of n-butylamine are added, and the mixture is refluxed for 30 minutes. Working up is effected by pouring the mixture on water and extracting thrice with methylene chloride. The organic phases are washed twice with water and dried with sodium sulphate. After removing the solvent on a water pump vacuum, the crude base results, which is obtained in pure form by crystallization from acetone. M.P. 173°.

The hydrochloride crystallized from ethanol has a M.P. of 274° (decomp.). $[\alpha]_D^{20}=+104°$ ($c=1.0$ in methanol).

EXAMPLE 3:
6-Methyl-8β-(3-methyl-3-ethyl-ureidomethyl)ergolene [process variant a)]

18.7 g (60.9 millimols) of 6-methyl-9-ergolene-8β-acetic acid azide are dissolved in 200 cc of chloroform, and the solution is boiled for 15 minutes. After the addition of 7.1 g (120 millimols) of methylethylamine, the mixture is refluxed for a further 35 minutes. The volatile components are removed on a water pump vacuum, and the resulting crude base is crystallized from isopropanol. M.P. 98°-99° (decomp.). $[\alpha]_D^{20}=+57.9°$ ($c=1.061$ in methanol).

EXAMPLE 4:
6-Methyl-8β-(3,3-diethyl-ureidomethyl)ergolene [process variant a)]

15 g (48.9 millimols) of 6-methyl-9-ergolene-8β-acetic acid azide, dissolved in 200 cc of chloroform, are reacted with 10.1 cc (97.8 millimols) of diethylamine and worked up as described in Example 3. The crude base crystallizes from isopropanol. M.P. 104°-105° (decomp.). $[\alpha]_D^{20}=+59.4°$ ($c=1.049$ in methanol).

EXAMPLE 5:
6-Methyl-8β-(1-pyrrolidino-carbamoylmethyl)ergolene [process variant a)]

10.8 g (35.2 millimols) of 6-methyl-9-ergolene-8β-acetic acid azide, dissolved in 150 cc of chloroform, are reacted with 5.96 cc (70.4 millimols) of pyrrolidine and worked up as described in Example 3. Crystallization of the crude base from isopropanol yields a pure product having a M.P. of 241°-242° (decomp.). $[\alpha]_D^{20}=+59.5°$ ($c=1.154$ in methanol).

EXAMPLE 6:
6-Methyl-8β-(3,3-dimethylureidomethyl)ergolene [process variant b)]

30.8 g (121.8 millimols) of 6-methyl-8β-aminomethyl-ergolene are dissolved in 500 cc of pyridine, and a solution of 13.4 cc (146.1 millimols) of dimethylcarbamoyl chloride in 90 cc of pyridine is added at −10°. The reaction solution is stirred at −10° for 5 minutes, and at 20° for 10 minutes. 750 cc of methylene chloride/methanol 4:1 and 250 cc of 2 N soda are added to the reaction mixture, and this is shaken vigorously. The usual extraction with methylene chloride/ethanol 4:1 yields a crude product, which is purified by chromatography on a 50-fold quantity of silica gel. The resulting product is crystallized from acetone. M.P. 190°–191° (decomp.). $[\alpha]_D^{20}=+67.3°$ ($c=0.508$ in methanol).

The 6-methyl-8β-aminomethyl-ergolene, used as starting material, may be produced as follows:

a. 6-Methyl-8β-mesyloxymethyl-ergolene 25 g (98.5 millimols) of lysergol are suspended in 150 cc of pyridine and 250 cc of acetonitrile, and a solution of 22.6 cc (290 millimols) of methanesulphonic acid chloride in 50 cc of acetonitrile is added. During the addition the temperature is not permitted to exceed 30°. After stirring at 25° for 2 hours, the reaction mixture is cooled to −20°, 200 cc of methanol are added, and the mixture is subsequently poured on water. The reaction mixture is rendered alkaline with a 2N ammonia solution and is extracted 4 times with 1 litre of methylene chloride/methanol 3:1. The organic phases are washed twice with water, dried with sodium sulphate and evaporated to dryness on a water pump vacuum. Decolouration with active charcoal and crystallization from methylene chloride/ethanol 2:1 yields a crystalline product with non-characteristic decomposition at 160°–175°. $[\alpha]_D^{20}=+83.6°$ ($c=0.5$ in methanol/methylene chloride 1:1). $[\alpha]_D^{20}=+60.1°$ ($c=1$ in dimethyl formamide).

b. 6-Methyl-8β-azidomethyl-ergolene 30 g (90 millimols) of 6-methyl-8β-mesyloxymethyl-ergolene are dissolved at 80° in 300 cc of hexamethylphosphoric acid trisamide, and a solution of 29.4 g (450 millimols) of sodium azide in 100 cc of water is added. After stirring at 80° for 3 hours, the reaction mixture is cooled to 25° and poured on 4 litres of water with vigorous stirring. The resulting precipitate is filtered off, and the filter cake is dissolved in 1.5 litres of methylene chloride. The water which is present is removed in a separating funnel, and the methylene chloride solution is dried with sodium sulphate. The solution is decolourized with active charcoal and is subsequently filtered. After concentrating by evaporation to a small volume at 30° in a vacuum, the cotton-like azide crystallizes. M.P. 191°–193° (decomp.). $[\alpha]_D^{20}=+86.5°$ ($c=0.5$ in dimethyl formamide).

c. 6-Methyl-8β-aminomethyl-ergolene 19.8 g (71 millimols) of 6-methyl-8β-azidomethyl-ergolene are suspended in 340 cc of dimethyl formamide, and a suspension of 160 g (710 millimols) of tin chloride in 1065 cc of a 2 N caustic soda solution is added portionwise at 0°–5°. After stirring at 25° for 2 hours, filtration is effected. The filtrate and the filter cake are exhaustively extracted with methylene chloride/methanol 9:1. The organic phases are washed twice with water, dried with sodium sulphate and decolourized with active charcoal. Evaporation to dryness gives a light violet foam, which after crystallization from ethyl acetate/methanol/methylene chloride yields the pure product having a M.P. of 232°–234° (decomp., sublimation in a high vacuum). $[\alpha]_D^{20}=+90.5°$ ($c=0.503$ in methanol).

EXAMPLE 7: 6-Methyl-8β-(ureidomethyl)ergolene [process variant b)]

17.3 g (68.5 millimols) of 6-methyl-8β-aminomethyl-ergolene are dissolved in 250 cc of methanol, 137 cc of 1 N hydrochloric acid, 5.64 g (69.5 millimols) of potassium cyanate and 10 cc of water are added. After refluxing for 2 hours, a further 75 cc of 1 N hydrochloric acid and 5 g of potassium cyanate and 80 cc of water are added. The reaction solution is kept at reflux temperature for a further 2 hours, is subsequently poured on water and extracted in the usual manner with methylene chloride/isopropanol 2:1. After removing the solvent a brown foam is obtained, which yields the pure product by chromatography on a 50-fold quantity of aluminum oxide. The title compound, having a M.P. of 232° (decomp.), $[\alpha]_D^{20}=+75.8°$ ($c=1$ in methanol), is obtained by crystallization from ethanol.

EXAMPLE 8:

6-Methyl-8β-(3-methylureidomethyl)ergolene [process variant b)]

13 g (51.7 millimols) of 6-methyl-8β-aminomethyl-ergolene are dissolved in 650 cc of dioxane, and 5.79 g (101 millimols) of methylisocyanate are added. After boiling at reflux for 10 minutes, the reaction solution is evaporated to dryness on a rotary evaporator. A dark brown foam is obtained, which is dissolved in 300 cc of ethanol, and 59.2 cc of 1 N hydrochloric acid are added. The resulting crystalline product is again crystallized from ethanol, whereby the title compound is obtained in the form of the hydrochloride having a M.P. of 188°–190°. $[\alpha]_D^{20}=+116.9°$ ($c=1.02$ in methanol).

What is claimed is:

1. A compound of the formula:

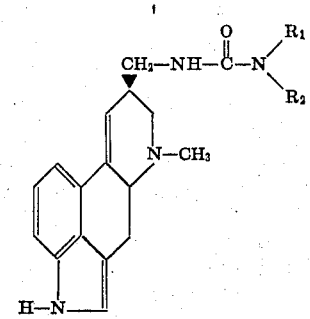

wherein each of $R_1$ and $R_2$ is hydrogen, or alkyl of 1 to 4 carbon atoms, or $R_1$ and $R_2$ together form an alkylene chain of 3 to 5 carbon atoms, or a pharmaceutically acceptable acid addition salt thereof.

2. The compound of claim 1, which is 6-methyl-8β-(3,3-dimethylureidomethyl)ergolene.

3. The compound of claim 1, which is 6-methyl-8β-(3-[n-butyl]-ureidomethyl)ergolene.

4. The compound of claim 1, which is 6-methyl-8β-(3-methyl-ureidomethyl)ergolene.

5. The compound of claim 1, which is 6-methyl-8β-(3,3-diethyl-ureidomethyl)ergolene.

6. The compound of claim 1, which is 6-methyl-8β-(1-pyrrolidino-carbamoylmethyl)ergolene.

7. The compound of claim 1, which is 6-methyl-8β-(ureidomethyl)ergolene.

8. The compound of claim 1 which is 6-methyl-8β-(3-methyl-3-ethyl-ureidomethyl)eroglene.

* * * * *